June 17, 1930.    O. OLBY    1,764,278
IMPLEMENT
Filed Sept. 21, 1928
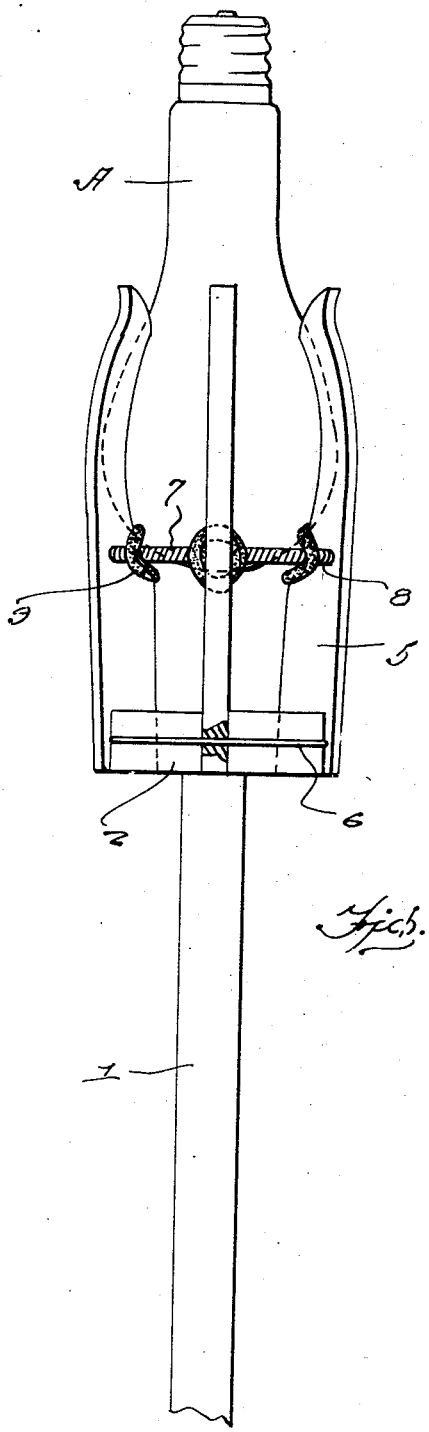
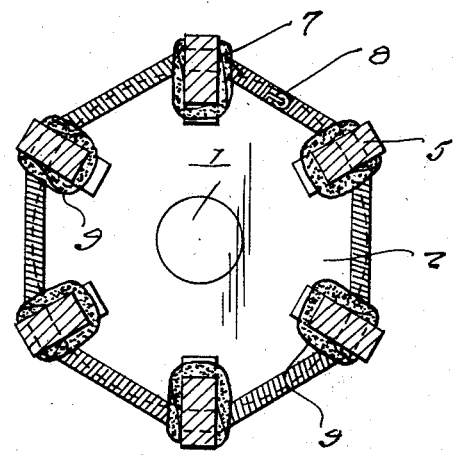
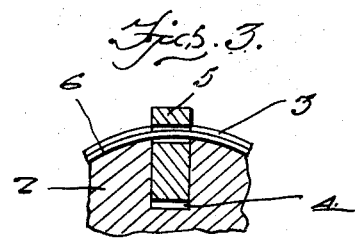
Inventor
O. Olby
By Clarence A. O'Brien
Attorney Patented June 17, 1930

1,764,278

UNITED STATES PATENT OFFICE

ODIN OLBY, OF ASHLAND, WISCONSIN

IMPLEMENT

Application filed September 21, 1928. Serial No. 307,481.

This invention relates to improvements in article handling implements and more particularly to that class of implement especially devised for use in changing electric light bulbs. Similar devices of this character have been constructed with the paramount aim in view of providing means whereby a bulb may be grasped without exerting too great pressure against the fragile body, yet at the same time affording sufficient friction to cause the turning of the bulb in unison with the implement. However, these devices are impractical in most cases, for the reason that the trend of development has been toward obtaining this friction by means of pressure.

The prime object of this invention is to obviate the necessity of employing such means, by providing an implement wherein a bulb may be snugly fitted and which will depend upon its frictional relation with the implement through the resilient means employed.

Another object of the invention resides in the provision of an implement into which a bulb may be inserted with ease and without liability of breaking the same.

Still another object resides in the simplicity of the device which will obviously permit the same to be manufactured at a reasonable cost.

Other important objects and advantages of this novel device will become apparent as the same is better understood from the following specification and claims.

In the drawings:

Figure 1 represents a side elevation of the implement with a portion of its handle removed, and showing the manner of associating the same with an electric light bulb.

Figure 2 represents an enlarged sectional view through the tensional fingers of the implement, and, Figure 3 is a fragmentary sectional view through the head of the implement and showing the means employed for pivotally connecting the tensional fingers to said head.

Referring to the drawings wherein like numerals designate like parts, an elongated handle 1 is provided at one end with an enlarged annular head 2. This annular head is formed with a peripheral groove 3 and a plurality of radiating slits 4.

A plurality of fingers 5 are each curved at one end portion, while the opposite ends of the fingers are formed with openings and disposed within the slits 4. A tie member 6 is arranged in the groove 3 and is adapted to extend through the openings in the aforementioned ends of the fingers for pivotally securing these fingers to the head 2.

The curved end portions of the fingers are of a curvature conforming with the contour of that portion of the bulb to be grasped, while the ends of these curved end portions are flared outwardly to permit the ready insertion of a bulb between the fingers 5.

These fingers are tensionally urged together by means of an elongated coiled spring 7. This spring is trained through openings in the fingers 5 and has its extremities connected together at 8 in any suitable manner.

Frictional means in the form of resilient bands 9 are arranged across the inner face of each finger 5 and are disposed outwardly of the coiled spring 7 at the opposite sides of the individual fingers 5. These bands by engaging the spring in this manner will obviously remain in substantially a permanent position so that the same may be engaged against the bulb when in the act of turning the same.

In the use of the implement, the bulb, which for example, is illustrated in the drawings and designated by A, is forked between the fingers 5. The tension of the fingers 5 afforded by the spring 7 is sufficient only to prevent the accidental displacement of the bulb from between the fingers, the fingers not solely in themselves being relied upon to afford the friction necessary in turning the bulb. By inserting the blunt portion of the bulb into the socket, and forcing the handle 1 toward the bulb, the resilient bands 9 will engage the bulb A and by rotating the implement, the bulb will turn in unison therewith.

Having thus described my invention, what I claim as new is:—

1. In an implement of the character described, a handle, an annular head at one end of the handle, said head being formed with radiating slits and with a peripheral groove, a plurality of fingers engaged at one of their ends in said slits, a member arranged in said groove and disposed through said ends of the fingers for pivotally connecting the same to the head, and tensional means for contracting said fingers.

2. An implement of the character described comprising a handle, an annular head at one end of the handle, said head being provided with radiating slits and with a peripheral groove, a plurality of fingers engageable at their inner ends in said slits, and a member arranged in said groove and disposed through said ends of the fingers for pivotally connecting the same to the head, said fingers being provided with openings at their intermediate portions, and a lineal tensioning element disposed through said openings for contracting the fingers.

3. An implement of the character described, comprising a handle, a plurality of pivotally mounted fingers at one end of the handle, said fingers being provided with openings, a tensional element disposed through said openings, for tensionally contracting the fingers, and annular resilient frictional members arranged across the inner face of each finger and held in position by the tensional element.

In testimony whereof I affix my signature.

ODIN OLBY.